United States Patent [19]

Nunogaki

[11] Patent Number: 4,858,961

[45] Date of Patent: Aug. 22, 1989

[54] ROTARY JOINT

[75] Inventor: Yoshiaki Nunogaki, Nagaokakyo, Japan

[73] Assignee: Sanki Engineering Ltd., Kyoto, Japan

[21] Appl. No.: 85,860

[22] Filed: Aug. 14, 1987

[30] Foreign Application Priority Data

Aug. 15, 1986 [JP] Japan ................................ 61-191824

[51] Int. Cl.$^4$ .............................................. F16L 17/00
[52] U.S. Cl. ...................................... 285/98; 285/101; 285/136
[58] Field of Search .................. 285/136, 279, 101, 98

[56] References Cited

U.S. PATENT DOCUMENTS

| 2,877,026 | 3/1959 | Poyne et al. | ..................... 285/136 X |
| 4,194,767 | 3/1980 | McCracken | ..................... 285/279 X |
| 4,683,912 | 8/1987 | Dubrosky | ..................... 285/136 X |

FOREIGN PATENT DOCUMENTS

| 564453 | 6/1960 | Belgium | ............................. 285/136 |
| 5770162 | 10/1955 | Japan . | |
| 56-10884 | 3/1981 | Japan . | |
| 58-1386 | 11/1983 | Japan . | |
| 1010723 | 11/1965 | United Kingdom | ................ 285/136 |

*Primary Examiner*—Dave W. Arola
*Attorney, Agent, or Firm*—Wenderoth, Lind & Ponack

[57] ABSTRACT

An improved rotary joint including first, second and third joint portions, and so arranged to connect two flow passages to each other respectively at the rotary unit side and stationary side so as to continuously effect, for example, centrifugal counter-current distribution work.

2 Claims, 3 Drawing Sheets

ROTARY JOINT

BACKGROUND OF THE INVENTION

The present invention generally relates to a joint or coupling and more particularly, to a rotary joint suitable for coupling a rotating liquid feed tube especially feeding a liquid in a very small amount under high pressure, with a stationary liquid feed tube.

Conventionally, the rotary joint is employed in a centrifugal counter-current distribution chromatograph apparatus disclosed, for example, in Japanese Patent Publication Tokkosho No. 58-1386, Japanese Patent Laid-Open Application Tokkaisho No. 56-10884, or Japanese Utility Model Laid-Open Application Jikkuisho No. 57-70162.

The centrifugal counter-current distribution chromatograph apparatus as referred to above includes a rotary unit, and a large number of columns or separation tubes forming one continuous fluid passage provided side by side, at upper and lower portions in the rotary unit, with axes of the respective separation tubes being directed in the diametrical direction of the rotary unit. The above fluid passage is connected to external feed tubes and flow-out tubes through rotary joints provided at opposite ends of the axis of said rotary unit, and while rotating together with the rotary unit, arranged to be continuously supplied with sample fluid through the feed tube so as to discharge the sample fluid into the flow-out tube through the separation tubes.

By the above arrangement, the counter-current distribution is effected in such a manner that, with the rotary unit in which a stationary liquid having a large specific gravity is preliminarily filled within the separation tubes being rotated, a moving liquid having a small specific gravity is fed under pressure into the separation tubes. In other words, under a centrifugal acceleration field, within the separation tubes, the moving liquid with the small specific gravity is displaced in the form of small particles, through the stationary liquid having the large specific gravity in a direction toward the rotary axis opposite to the direction of the centrifugal force. In the process o the above displacement, the composition readily soluble the stationary liquid and contained in the moving liquid, is dissolved into the stationary liquid, and after the composition readily soluble into the stationary liquid been removed through repetition of the above counter-current distribution per each separation tube, the moving liquid flows into the flow-out tube.

As is seen from the above description, the apparatus of this kind is arranged to continuously effect mixing and separation of the stationary liquid and moving liquid under the centrifugal acceleration field, thereby to remove from the moving liquid, the composition readily soluble into the stationary liquid.

In the chromatograph apparatus having the construction as described above, each rotary joint is intended to connect together the flow passages, each one at the rotary member side and the stationary side, and only the moving liquid flows through the passages, with the stationary liquid staying within the separation tubes.

Accordingly, as the counter-current distribution is repeated, the concentration of the dissolved composition in the stationary liquid reaches a saturated state.

Therefore, when the counter-current distribution is repeated, it becomes necessary to first suspend the distribution work, and stop the supply of the moving liquid so as to refill a fresh stationary liquid, with the used stationary liquid being removed from the interior of the separation tubes, thus rendering the operation to be of a batch type, with a consequent reduction of the working efficiency.

Furthermore, in the known apparatus as described so far, there has been the problem that, even in the case where it is necessary to check the state of the concentration distribution of the dissolved composition in the stationary liquid per each separation tube, the distribution of the above concentration is undesirably disturbed during withdrawal of the stationary liquid from the separation tube, thus making it impossible to check the state correctly.

SUMMARY OF THE INVENTION

Accordingly, an essential object of the present invention is to provide an improved rotary joint which is arranged to connect two flow passages to each other, respectively at the rotary unit side and stationary side so as to continuously effect, for example, the centrifugal counter-current distribution.

Another important object of the present invention is to provide a rotary joint of the above described type which is simple in construction and stable in functioning, and can be readily manufactured at low cost.

In accomplishing these and other objects, according to one preferred embodiment of the present invention, there is provided a rotary joint which includes a first joint portion provided with a first sliding face perpendicular to a central axis thereof, a first flow passage formed on the central axis so as to be communicated with an external flow passage, and second flow passages open on a circumference having the central axis in said first sliding face as a center and also communicated with an external flow passage at the side opposite to said opening, a second joint portion provided with a third flow passage and a fourth flow passage communicated with external flow passages, and coupled with said first joint portion through a bearing means for free relative rotation therebetween, and a third joint portion provided with a second sliding face perpendicular to the central axis, a fifth flow passage formed on the central axis so as to be communicated with said first and third flow passages and a sixth flow passage formed along the central axis so as to be communicated with said second and fourth flow passages, with said third joint portion being coupled with said second joint portion through a pressure space so as to be urged in a direction away therefrom, whereby said second sliding face of said third joint portion slidably contacts said first sliding face of said first joint portion, with said fifth flow passage being separated from said sixth flow passage.

By the arrangement according to the present invention as described above, an improved rotary joint has been advantageously presented through simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
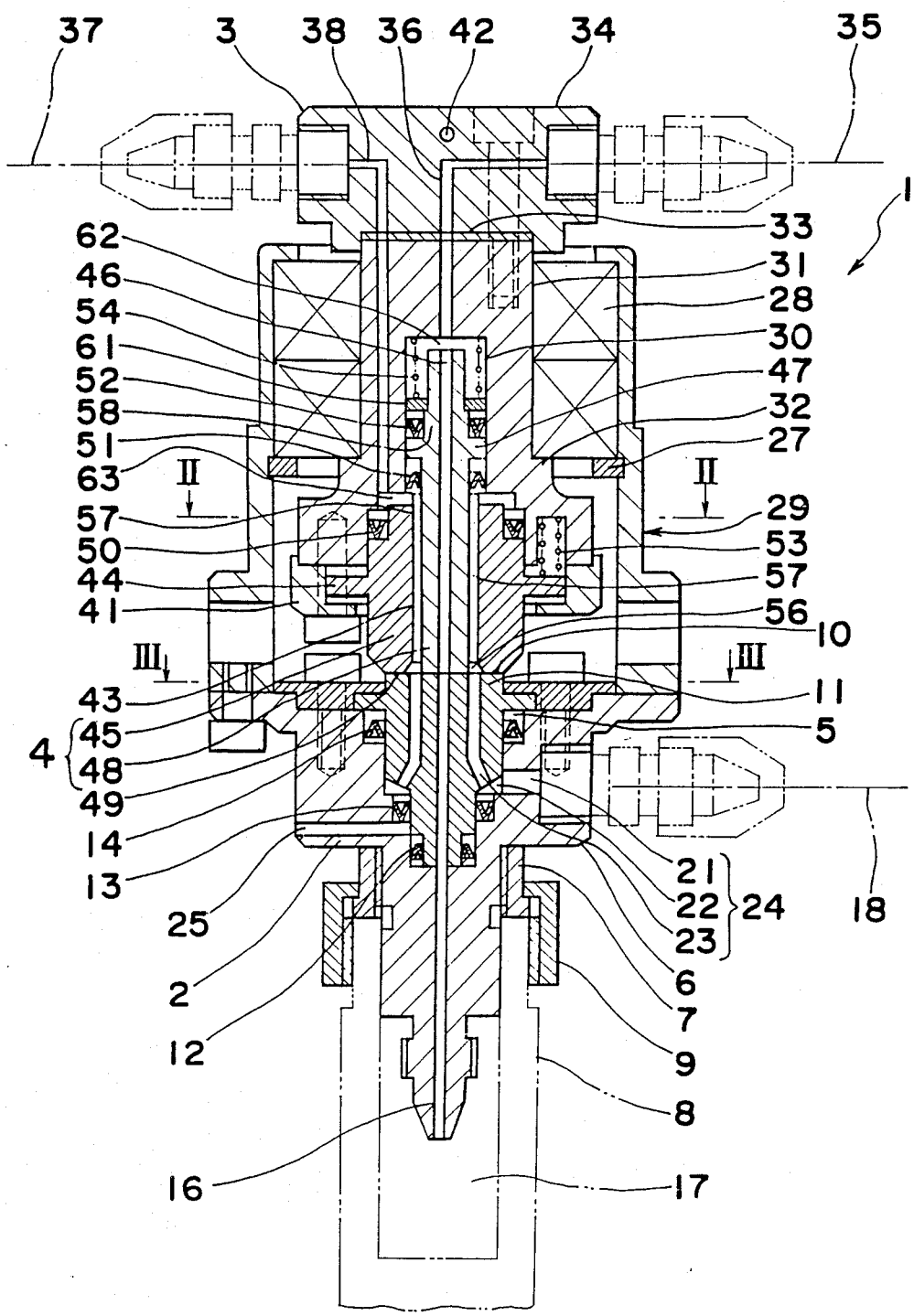
FIG. 1 is a longitudinal sectional view of a rotary joint according to one preferred embodiment of the present invention.

Before the description of the present invention proceeds, it is to be noted that like parts are designated by like reference numerals throughout the accompanying drawings.

Figure 2:
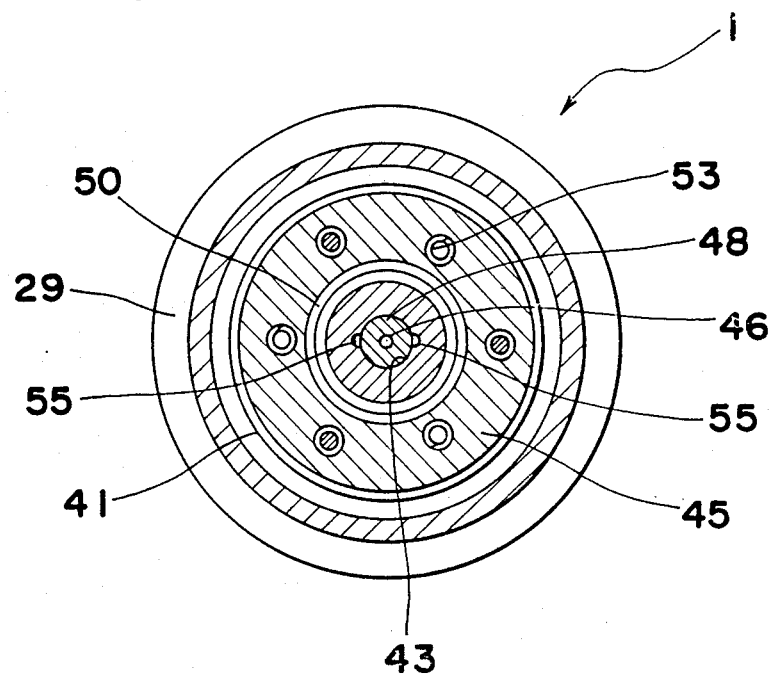
FIG. 2 is a cross section taken along the line II—II in FIG. 1.
Figure 3:
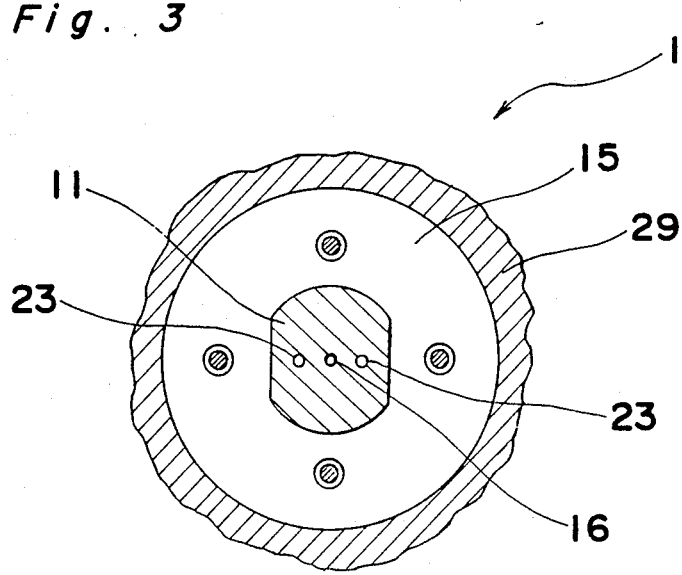
FIG. 3 is a cross section taken along the line III—III in FIG. 1.

Referring now to the drawings, there is shown in FIGS. 1 to 3 a rotary joint 1 according to one preferred embodiment of the present invention. The rotary joint 1 generally includes a first joint portion 2, a second joint portion 3, and a third joint portion 4.

The first joint portion 2 has a first external flow passage connecting portion 6 formed with a stepped recess 5 at its central portion, and is fixed to a rotary shaft 8 for simultaneous rotation as one unit therewith by engaging a cap nut 9 threaded onto the end portion of the rotary shaft 8, with a flange portion of an annular member 7 threaded to the lower portion of the connecting portion 6 for securing as shown. In the recess 5, a first sliding member 11 made, for example, of a ceramic material, and formed with a first sliding face 10 perpendicular to a center axis located on an axis of the rotary shaft 8 is fitted through first, second and third V-packings 12, 13 and 14, and fixed by an annular presser plate 15 so as to be rotatable as one unit with the first external flow passage connecting portion 6. More specifically, disengagement of the first sliding member 11 from the recess 5 is prevented by depressing the flange portion of said first sliding member 11 by the presser plate 15, while relative rotation between the presser plate 15 and the first sliding member 11 is prevented by fitting a non-circular opening, e.g., a rectangular opening rounded at corner portions as shown in FIG. 3 and formed in the presser plate 15, over a head portion having a similar cross section, of said first sliding member 11.

Thus, a first flow passage 16 is formed to extend through the center axes of the first sliding member 11 and the first external flow passage connecting portion 6, and is communicated with an external flow passage 17 open at the end portion of the rotary shaft 8.

Moreover, a first through-opening 21 is formed to extend through the side portion of the recess 5 for communication with an external flow passage 18, while a plurality of second through-openings 23 in a suitable number, extending vertically through the first sliding member 11 and communicated with said first through-opening 21 through an annular space 22, are formed to be opened along the circumference having the center axis as a center, thereby to form a second flow passage 24.

Leakage of a liquid in the first flow passage 16 through a gap between the first sliding member 11 and the first external flow passage connecting portion 6, is adapted to be prevented by the first V-packing 12, while leakage of the liquid in the second flow passage 24 is to be stopped by the second and third V-packings 13 and 14, and even when part of the liquid should pass through the first and second V-packings 12 and 13, such liquid is adapted to be removed by a first drain hole 25 formed to extend through the side portion of the recess 5.

The first external flow passage connecting portion 6 is further provided with a second drain hole (not particularly shown), and a presser cylinder 29 holding an outer-race of a bearing 28 by a flange portion at the upper face and a C-shaped retaining ring 27 provided at the inner face is fixed thereto.

The second joint portion 3 has a holding member 31 of a circular cross section, formed with a stepped recess or chamber 30 for accommodating the third joint portion 4 therein, and by supporting the lower portion of the inner-race of the bearing 28 by a stepped portion 32 formed on its outer periphery, it is coupled with the presser cylinder 29, i.e, the first joint portion 2 for free relative rotation. Moreover, at the upper portion of this holding member 31, there is mounted a second external flow passage connecting portion 34 through a sheet material 33 for sealing, and a third flow passage 36 communicated with an external flow passage 35, and a fourth flow passage 38 similarly communicated with another external passage 37 through the holding member 31, sheet material 33 and second external flow passage connecting portion 34 are formed.

Furthermore, at the lower portion of the holding member 31, a presser ring 41 with an inner flange for holding the third joint portion 4 is fixed, while a pin hole 42 for receiving a stopper pin for prevention of rotation is formed in the second external flow passage connecting portion 34.

The third joint portion 4 includes a cylindrical second sliding member 45 formed with a third through-opening 43 at its central portion and a first flange portion 44 on its outer periphery, and a cylindrical third sliding member 48 formed with a fifth flow passage 46 extending through its center axis and a second flange portion 47 on its outer periphery, with its forward end portion being slidably fitted into said third through-opening 43, and thus, a second sliding face 49 perpendicular to the center axis is formed by said sliding members 45 and 48 made, for example, of carbon material.

Of the second and third sliding members 45 and 48, the sliding member 45 is slidably fitted in a recess 30 through a fourth V-packing 50, and prevented against disengagement from the recess or chamber 30 by the presser ring 41 through a suitable gap at the first flange portion 44, while being urged at all times, in the direction to be disengaged from the recess 30 by a first spring 53 disposed between the holding member 31 and the first flange portion 44.

Meanwhile, in the inner wall of the third through opening 43, a plurality of grooves, e.g., two grooves 55 are formed, while within the second sliding face 49, an annular cutting portion 56 having the center axis of the sliding face 49 as a center and intersecting said two grooves 55 is formed, and thus, in a state where the third sliding member 48 is fitted in the through-opening 43, sixth flow passages 57 are provided by these grooves 55.

The third sliding member 48 is fitted at its second flange portion 47, through fifth and sixth V-packings 51 and 52 disposed at its opposite sides, in the recess or chamber 30, while simultaneously, said sliding member 48 is normally urged in a direction away (i.e., downwardly as viewed in FIG. 1) from the bottom face of the recess 30 by a spring 54 disposed between a washer 61 engaged with a stepped portion 58 formed at the upper end portion thereof and the bottom face of the recess or chamber 30.

Thus, the third flow passage 36 and the fifth flow passage 46 are communicated with each other through a space 62 between the bottom face of the recess or chamber 30 and the third sliding member 48, while leakage of the liquid contained in this space 62 is prevented by the washer 61 and the sixth V-packing 52, so that by the pressure exerted by this liquid, the third sliding member 48 is urged in the same direction as that of a force produced by the second spring 54. Similarly, the fourth flow passage 38 is communicated with the sixth flow passage 57 through a space 63 between the recess or chamber 30 and the bottom portion of the second sliding member 45, while leakage of the liquid within this space 63 is prevented by the third and fourth V-packings 14 and 50, whereby the second sliding member 45 is urged in the same direction as that of a force of the first spring 53 by the pressure exerted by the liquid.

More specifically, the second sliding face 49 is held in sliding contact with the first sliding face 10 by the urging forces of the first and second springs 53 and 54 for communication of the first flow passage 16 and the fifth flow passage 46, and the second flow passages 24 and the sixth flow passages 57, while the spaces 62 and 63 referred to above are arranged to act as pressure spaces for causing the second sliding face 49 to closely adhere to the first sliding face 10 individually by the second and third sliding members 45 and 48. Thus, even in the case where the pressure of the liquid in each flow passage is high, leakage of the liquid at the respective sliding faces is effectively prevented.

As is seen from the foregoing description, the first and second flow passages 16 and 24 adapted to rotate with the rotary member by the rotary joint 1 having the construction as described so far, are communicated with the stationary third and fifth flow passages 36 and 46 or the fourth and sixth flow passages 38 and 57 so as to form continuous two flow passages.

It should be noted here that, in the above embodiment, although the first and second flow passages 16 and 24 are set to the rotary member side, with the third, fourth, fifth and sixth flow passages 36, 38, 46 and 57 adapted to be at the stationary side, the construction of the present invention is not limited to the above, but may be arranged to be contrary to the above or modified so that both of them are rotated.

It should also be noted here that, in the foregoing embodiment, in order to cause the second sliding face 49 to positively contact the first sliding face 10 at the opposite sides of the annular cutting or recess portion 56, the second sliding member 45 and the third sliding member 48 are adapted to be independently slidable, but the arrangement of the present invention is not limited to the above, but may be modified in various ways within the scope. For example, there may be included a modification in which the fifth flow passage 46 and the sixth flow passage 57 are formed with the same sliding member by properly providing sealing means between the fifth and sixth flow passages 46 and 57, and also at the outer side of said sixth flow passage 57. Meanwhile, the annular cutting portion 56 may be provided at the side of the sliding face 11.

Figure 4:
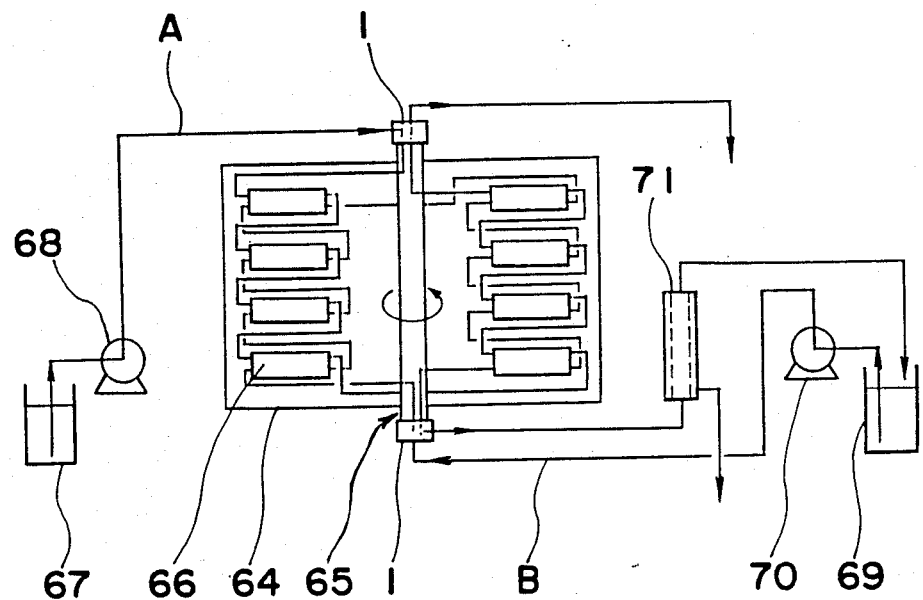
FIG. 4 is a schematic flow passage system diagram of a centrifugal counter-current distribution chromatograph apparatus to which the present invention may be applied.

Referring further to FIG. 4, there is shown a centrifugal counter-current distribution chromatograph apparatus to which the rotary joint according to the present invention may be applied. In the arrangement of FIG. 4, the rotary joint 1 is attached to each of opposite ends of a rotary shaft 65 of a rotary unit 64 thereof as shown.

Within the rotary unit 64, a large number of columns or separating tubes 66 are arranged vertically, with respective axes thereof directed in the diametrical direction of said rotary unit 64. The separating tubes 66 are respectively connected to each other by two kinds of tubes to form two continuous flow passages A and B. More specifically, the flow passage A continues from a first tank 67 onto the outer side of the rotary unit 64 through a first pump 68, the upper rotary joint 1, the separating tubes 66, and further, the upper rotary joint 1, while the flow passage B continues from a second tank 69, onto said second tank again via a second pump 70, the lower rotary joint 1, the separating tubes 66, the lower rotary joint 1 and a film separator 71. It is to be noted that in the respective separating tubes 66, the direction of flow of the passage A is set to be opposite to the direction of centrifugal force, while the direction of flow of the passage B is set to be the same as the direction of the centrifugal force so as to allow a liquid having a smaller specific gravity than that in the flow passage B, to flow through the flow passage A.

By the above arrangement, for example, in the state where the rotary unit 64 is rotated, with fat or oil dissolved in n-hexane, which is a kind of solvent of hydrocarbon group, being accommodated in the first tank 67, and with a water-soluble lipase, which is a kind of enzyme, being contained in the second tank 69, both of the liquids are fed into the rotary unit 64 by the first and second pumps 68 and 70. As a result, since the fat or oil dissolved in the solvent is smaller in the specific gravity than the lipase in the two liquids, the counter-current distribution is effected within the respective separating tubes 66 under the centrifugal accelerating field. Thus, the lipase which removes the impurities in the fat or oil continuously flows, without staying in the separating tubes 66, so as to be replaced at all times, whereby, for example, fatty acid, which is a raw material for a detergent, is continuously produced from the fat or oil. On the other hand, the lipase coming out from the rotary unit 64 and containing impurities is fed to the film separator 71, and after separation of the impurities therefrom, it is returned to the second tank 69 again for use through circulation.

In the manner as described so far, the chromatograph apparatus of FIG. 4 is arranged to continuously manufacture fatty acid by causing the fat or oil and lipase to flow therethrough.

Besides the above purpose, for example, if cholesterol is fed into the first tank 67, with cholesterol oxidase supplied into the second tank 69, cholesterol oxide may be produced, and thus, the apparatus of FIG. 4 may be applied to various other uses such as an enzyme reactor, oil and fat manufacturing apparatus, etc.

As is clear from the foregoing description, according to the present invention, the rotary joint includes the first joint portion provided with the first sliding face perpendicular to the central axis thereof, the first flow passage formed on the central axis so as to be communicated with the external flow passage, and the second flow passages open on the circumference having the central axis in said first sliding face as a center and also communicated with the external flow passage at the side opposite to said opening, the second joint portion provided with the third flow passage and the fourth flow passage communicated with the external flow passages, and coupled with said first joint portion through the bearing means for free relative rotation therebetween, and the third joint portion provided with the second sliding face perpendicular to the central axis, the fifth flow passage formed on the central axis so as to be communicated with said first and third flow passages and the sixth flow passage formed along the central axis so as to be communicated with said second and fourth flow passages, with the third joint portion being coupled with said second joint portion through the pressure space so as to be urged in a direction away therefrom, whereby said second sliding face of said third joint portion slidably contacts said first sliding face of said first joint portion, with said fifth flow passage being separated from said sixth flow passage.

Accordingly, it becomes possible to connect the two liquid flow passages in the rotary unit, with the corresponding two stationary flow passages, and for example, if the rotary joint according to the present invention is applied to a centrifugal counter-current distribution chromatograph apparatus, the conventional batch type operation may be replaced by a continuous operation of the apparatus for improved productivity.

It should be noted here that the present invention is not limited in its application to the centrifugal counter-current distribution chromatograph apparatus alone, but may be readily applied to various other apparatuses of similar types within the scope.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A rotary joint comprising:
a first joint portion including a first sliding member having a first sliding face perpendicular to a central axis thereof, a first flow passage along the central axis thereof and through said first sliding face, a first external flow passage, and means for communicating said first flow passage with said first external flow passage, and a second flow passage through said first sliding face and separate from said first flow passage, a second external flow passage, and means for communicating said second flow passage with said second external flow passage;
a second joint portion including a third flow passage and a fourth flow passage, a third and a fourth external flow passage, means for communicating said third and fourth flow passages with said third and fourth external flow passages, and said second joint portion being freely relatively rotatable with said first joint portion;
a third joint portion rotatably mounted between said first and second joint portions, and including a second sliding member and a third sliding member, said second and third sliding members defining jointly a second sliding face perpendicular to the central axis, said second sliding face being slidable relative to said first sliding face of said first joint portion, said third joint portion having a fifth flow passage along the central axis thereof and through said second sliding face of said third sliding member, means for communicating said fifth flow passage with said first and third flow passages, said third joint portion having a sixth flow passage separate from said fifth flow passage and through said second sliding face of said second sliding member, and means for communicating said sixth flow passage with said second and fourth flow passages;
means for holding together said first, second, and third joint portions; and
a biasing means for urging said third joint portion in a direction away from said second joint portion for contacting said second sliding face of said third joint portion with said first sliding face of said first joint portion for providing fluid sealing and for maintaining fluid communication between said fifth and first flow passages and between said sixth and second flow passages.

2. A rotary joint as in claim 2, wherein said biasing means for urging said third joint portion away from said second joint portion includes spring means between said third joint portion and said second joint portion, and at least one pressure space between at least one of said fourth and sixth flow passages and said third and fifth flow passages for urging said third and second joint portions apart by the force exerted on said third and second joint portions by a fluid in said at least one pressure space.

* * * * *